United States Patent [19]
Patel et al.

[11] Patent Number: 5,529,828
[45] Date of Patent: * Jun. 25, 1996

[54] ENHANCEMENT OF ELECTROMAGNETIC BARRIER PROPERTIES

[75] Inventors: Kirit Patel, Spencer; John R. Pennace, Paxton, both of Mass.

[73] Assignee: Flexcon Company, Inc., Spencer, Mass.

[*] Notice: The portion of the term of this patent subsequent to May 18, 2007, has been disclaimed.

[21] Appl. No.: 239,212

[22] Filed: May 6, 1994

Related U.S. Application Data

[63] Continuation of Ser. No. 973,842, Nov. 9, 1992, Pat. No. 5,310,576, which is a continuation of Ser. No. 471,415, Jan. 29, 1990, Pat. No. 5,211,997.

[51] Int. Cl.$^6$ .............. G02B 27/22; B05B 5/00; C23C 16/00; B47F 1/14
[52] U.S. Cl. .............. 428/156; 428/29; 428/30; 428/164; 428/319.1; 427/160; 427/250; 427/256; 427/271; 359/478; 359/479; 359/620; 359/627
[58] Field of Search .............. 428/156, 164, 428/29, 30, 167, 160, 319.1; 359/478, 479, 620, 627; 427/250, 256, 271, 160

[56] References Cited

U.S. PATENT DOCUMENTS

| | | | |
|---|---|---|---|
| 3,357,772 | 12/1967 | Rowland | 350/167 |
| 3,357,773 | 12/1967 | Rowland | 350/167 |
| 3,496,058 | 2/1970 | Schroter et al. | 161/119 |
| 3,617,336 | 11/1971 | Gilard et al. | 117/40 |
| 4,264,664 | 4/1981 | Kunz | 428/142 |
| 4,456,515 | 6/1984 | Krueger et al. | 156/640 |
| 4,848,564 | 7/1989 | Scheller et al. | 428/156 |
| 5,105,306 | 4/1992 | Ohala | 359/478 |
| 5,182,157 | 1/1993 | Fitch | 428/137 |
| 5,211,997 | 5/1993 | Patel et al. | 428/164 |
| 5,310,576 | 5/1994 | Patel et al. | 428/164 |

*Primary Examiner*—Asok Pal
*Assistant Examiner*—Kathryne E. Shelborne
*Attorney, Agent, or Firm*—Samuels, Gauthier, Stevens & Reppert

[57] ABSTRACT

A method and structure for enhancing electromagnetic barrier properties including a substrate, a coating deposited upon the substrate, and a plurality of sets of patterns microembossed upon the surface of the coating layer for increasing the barrier properties of the structure. The plurality of sets of microembossed patterns each having a line density between about 100 and 50,000 lines per square centimeter.

20 Claims, 4 Drawing Sheets

MULTIPLE REFLECTIONS PRODUCE
COMPONENTS THAT CANCEL

ENHANCEMENT OF ELECTROMAGNETIC BARRIER PROPERTIES

This is a continuation of application Ser. No. 07/973,842, filed on Nov. 9, 1992, now U.S. Pat. No. 5,310,576, which is a continuation of U.S. patent application Ser. No. 07/471,415, filed on Jan. 29, 1990, now U.S. Pat. No. 5,211,997.

This invention relates to cellular materials, including cellulosic materials, and more particularly the enhancement of such electromagnetic barrier properties as optical density and thermal insulative effect.

Cellular materials have a desirable thermal insulative property by virtue of the presence of cellules of air interspersed among the fibers that constitute the overall structure of the materials.

However, because of the air nodules, there is a degree of light porosity that is undesirable in many cases.

Accordingly, it is an object of the invention to increase the electromagnetic barrier properties of materials. Another object of the invention is to reduce the light porosity of cellulosic and other materials consitituted by structures having a high degree of porosity.

Another object of the invention is to increase the thermal insulative effect of such materials.

SUMMARY OF THE INVENTION

In accomplishing the foregoing and related objects the invention provides a method of altering the properties of a structure by providing a substrate, applying a surface layer upon the substrate, and modifying the surface layer to increase the barrier properties of the structure.

In accordance with one aspect of the invention the modifying step can be accomplished by increasing the surface reflectance of the surface layer.

In accordance with another aspect of the invention the modifying step entails the step of forming a succession of elevations and depressions in the surface layer upon the substrate. In particular, the modifying step can be achieved by forming angled peak and valleys in the surface of the layer for increasing the barrier properties of the structure.

A structure in accordance with the invention includes a substrate, a layer upon the substrate, and means upon the surface of the layer for increasing the barrier properties of the structure.

In accordance with one aspect of the structure, the layer is metallic and bears an embossed pattern. A particularly desirable form of the surface pattern is microembossed. The microembossed pattern desirably has a line density between about 1,000 and 50,000 lines per centimeter. However, a suitable line density can be in the range from about 100 to 1,000 lines per square centimeter.

In accordance with a further structure for exhibiting enhanced barrier properties, a coating is deposited upon a substrate, and a special pattern is formed in the coating so that barrier properties of the structure are increased. The coating can be a metallic layer having a thickness less than one millionth of an inch, or about 0.4 millionths of a centimeter (400 angstroms).

In accordance with a further structure for exhibiting enhanced barrier properties, the substrate is cellular and can be of expanded foam. The coating can be formed by vaporization and condensation upon a substrate.

In a further method of enhancing the barrier properties of a substrate, a surface coating is applied to a substrate and the surface of the coating is modified in order to increase the degree of reflectance of incident electromagnetic energy of falling upon the coating. This reduces the penetration of the substrate by incident electromagnetic energy. The electromagnetic energy can be in the range of visible light. Alternatively, the incident electromagnetic energy can have a frequency below infrared, or be in the range of ultraviolet and beyond. The coating can be formed by vaporization and condensation, for example by vacuum metallization.

The metallized coating can be provided with an irregular surface pattern, for example in at least two different degrees of variation. The patterns can be in the form of surface corrugations which are disposed at an angle with respect to each other, The patterns advantageously form at least a right angle between them, The surface irregularities can be provided by at least three different patterns. The surface patterns can be uniformly distributed to form a symmetric repetitive pattern on the surface of the substrate.

BRIEF DESCRIPTION OF THE DRAWINGS

Other aspect of the invention will become apparent after considering several illustrative embodiments taken in conjunction with the drawings in which.

DETAILED DESCRIPTION

Figure 1A:
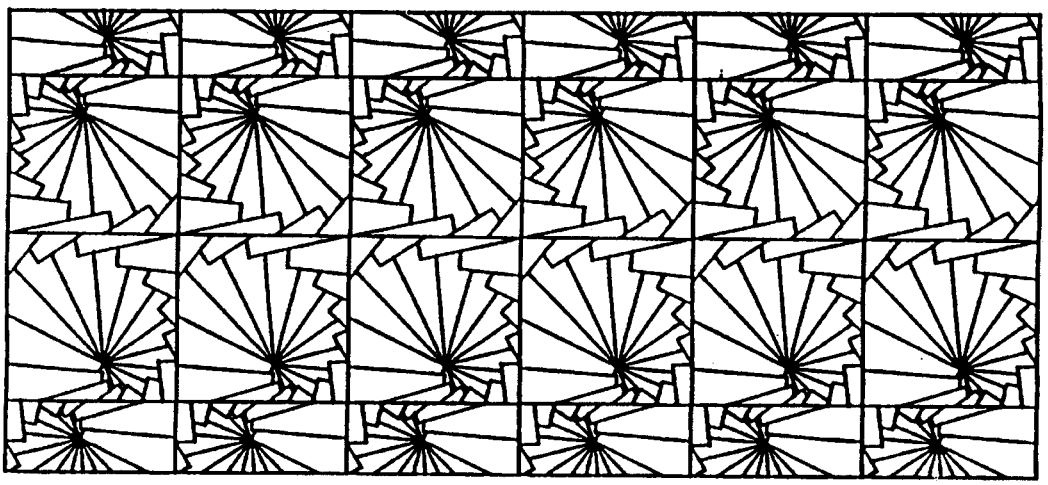
FIG. 1A and 1B are samples of a material with enhanced barrier properties in accordance with the invention.

With reference to the drawings, FIG. 1A shows a sample of material 10 with enhanced barrier properties in accordance with the invention. Also shown in FIG. 1B is an illustrative cross-section of the sample.

Figure 1B:
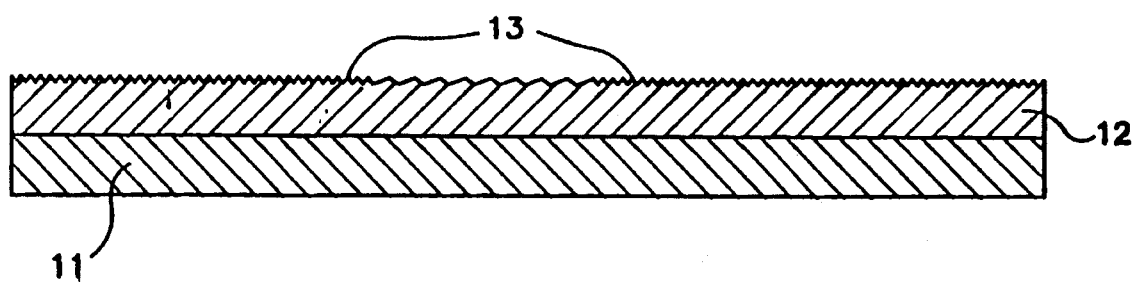

The material 10 is formed by a substrate 11, which in the case of FIG. 1B is of cellulosic material. It will be understood that the substrate may be of any suitable material including various plastic films of polyethylene, polypropylene and the like. Superimposed upon the substrate 11 is a coating 12, which in the case of FIG. 1B is a thin metallic film of the kind produced by vacuum metallization in which a metallic substance,-such as aluminum, is vaporized and then condensed upon the substrate 11.

The invention achieves a suitable barrier to electromagnetic radiation, ranging from ordinary electromagnetic radiation associated with radio and microwave transmissions, through the frequencies associated with heat energy, including infrared radiation, and extending through the visible spectrum to ultraviolet radiation and beyond. This is accomplished by special treatment of the coating 12. In particular, the coating 12 is provided with a prescribed set of surface modifications, such as those achieved by particular indentations 13. These function in various ways described below to achieve a barrier effect. The indentations 13 are applied to the surface in a preassigned pattern. In the case of FIG. 1A the patterns are in a plurality of sets such that one set of reflects incident energy having a first angle of incidence and another set reflects energy having a another angle of incidence, different from the first. In addition, the various patterns are repeated and provided with a specified degree of symmetry.

Figure 2:
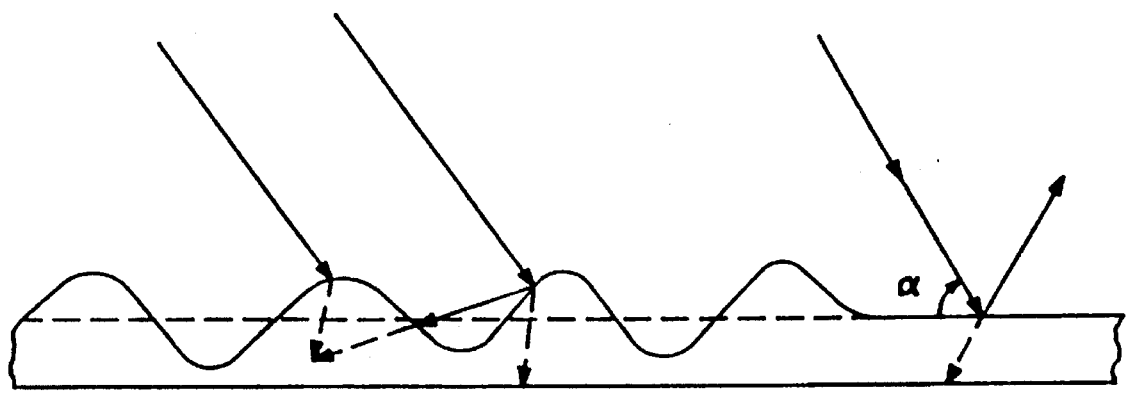
FIG. 2 is a diagram illustrating one possible explanation for the enhanced barrier properties achieved in accordance with the invention.

One possible explanation for the enhanced barrier properties achieved by the invention is illustrated in FIG. 2 which shows sinusoidal surface irregularities produced by the invention so that incident energy represented by the ray R falls upon a bulge as shown and is partially reflected as indicated by the ray R'. Because of multiple reflections from the bulges and their redirection into adjoining regions of the coating, it is speculated that they produce components which have various phase relations with one another and produce a high degree on cancellation of the transmitted components.

Figure 3:
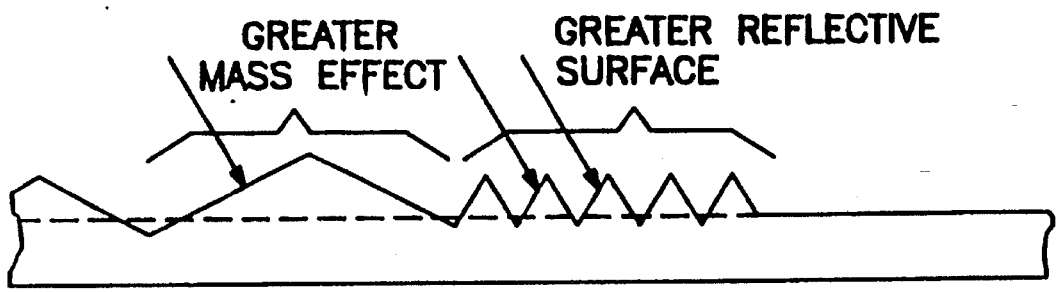
FIG. 3 is a diagram illustrating another possible explanation for the enhanced barrier properties achieved in accordance with the invention.
Figure 4:
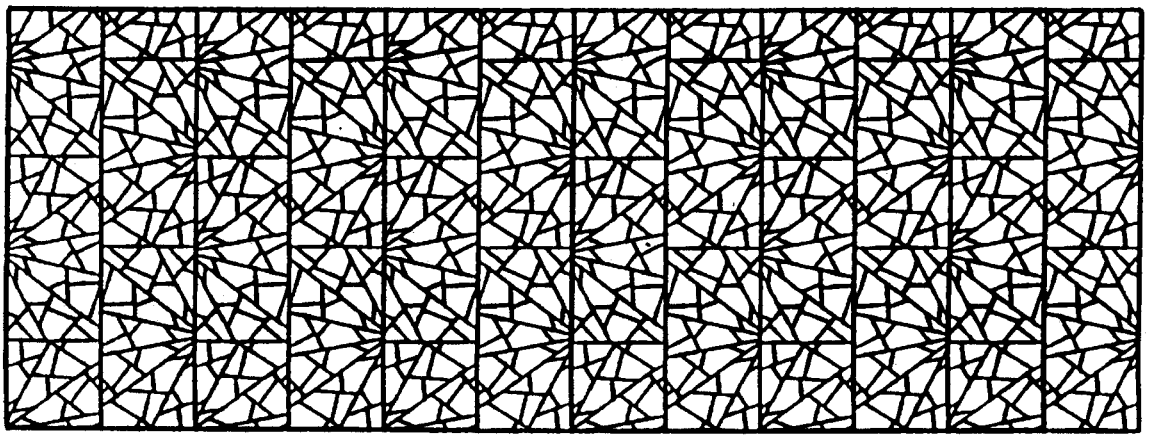
FIG. 4 is a further sample of a material with enhanced barrier properties in accordance with the invention.
Figure 5:
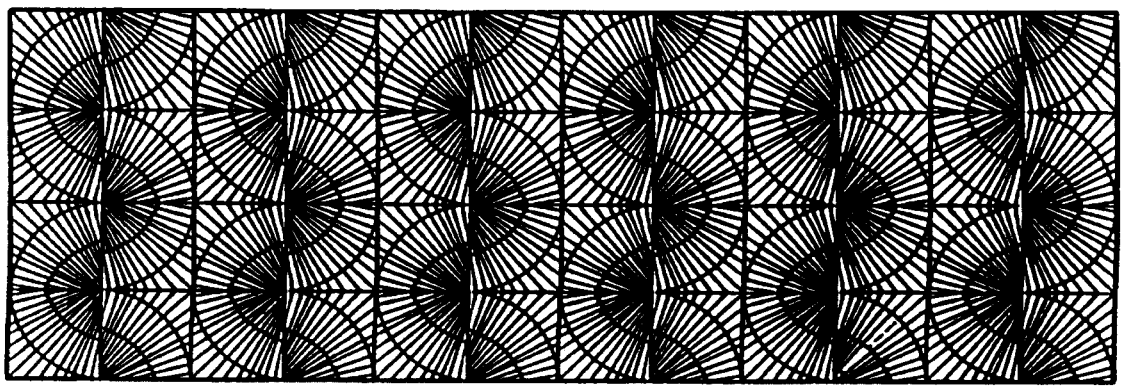
FIG. 5 is yet another sample of a material with enhanced barrier properties in accordance with the invention.
Figure 7:
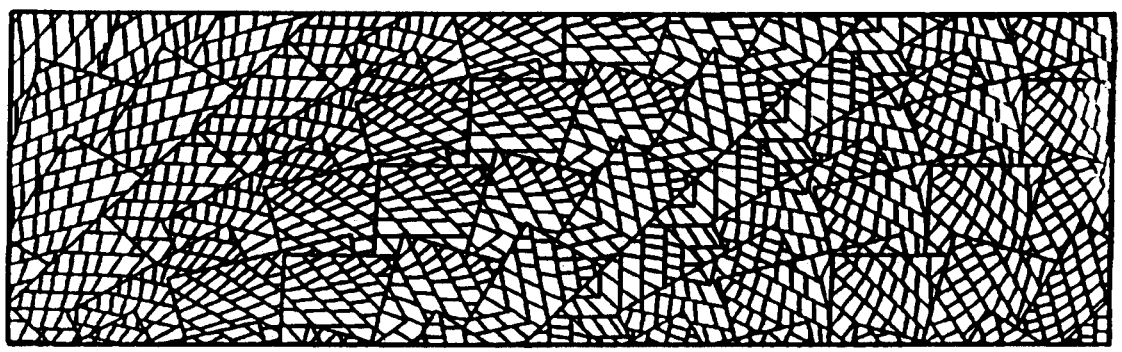
FIGS. 6 and 7 are further samples of a material with enhanced barrier properties in accordance with the invention.
Figure 6:
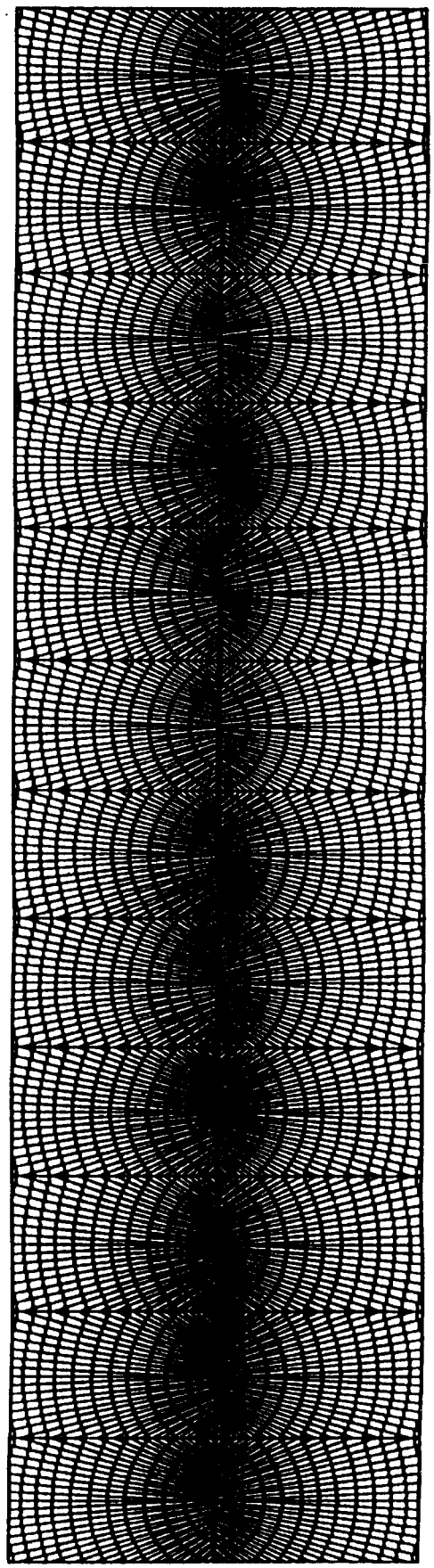

Another possible explanation for the enhanced barrier properties achieved by the invention is illustrated in FIG. 3 where the surface coating of the substrate has been provided with a set of irregularities so that the incident energy that falls upon the irregular pattern has to penetrate additional material in the regions where the coating has been agglomerated as compared with the adjoining regions where the amount of coating has been reduced. The overall effect of the change in the distribution of mass of the coating is believed to enhance the barrier property.

More over, because the surface coating has been provided with a series of hills and valleys, the reflective surface of the coating is increased. This also contributes to the improved barrier effect. The edge of the substrate where the coating has been applied without the irregularities that characterize the invention, shows a ray that strikes at an angle of incidence and is partially reflected. However, since the amount of mass through which the penetrating energy passes is considerably less than for those regions where there is an irregular surface pattern, there is a reduced barrier effect.

In tests that have been conducted of a surface pattern which has been irregularized in accordance with the invention, as compared with smooth edge strips of the coating where no irregularity has been produced, the barrier effect of the invention has been significantly demonstrated.

In addition, the barrier properties of the invention are enhanced by forming various irregular patterns which further tend to produce multiple reflections of the incident energy and further produce mass agglomerations that attenuate the energy that does manage to penetrate the coating.

Examples of various patterns that provide an enhanced barrier effect are shown in FIGS. 4–7. In some cases the patterns are symmetric, in other cases they are antisymmetric, in all cases there are various patterns which are distributed across the surface of the substrate for which enhanced barrier properties are desired.

We claim:

1. A method of altering the electromagnetic barrier properties of a structure which comprises the steps of:
   (a) providing a substrate,
   (b) applying a surface layer upon said substrate, and
   (c) modifying said surface layer by microembossing said surface layer with a plurality of sets of patterns, said plurality of sets of microembossed patterns each having a line density between about 100 and 50,000 lines per square centimeter and having a depth less than the thickness of said surface layer such that said substrate is not altered, in order to increase the barrier properties of said structure, said surface layer being metallized.

2. The method of claim 1 wherein the modifying step comprises the step of forming a succession of elevations and depressions in said surface layer upon said substrate.

3. The method of claim 2 wherein the modifying step comprises the step of forming angled peaks and valleys in the surface of said layer for increasing the barrier properties of said structure.

4. The method of claim 1, wherein said surface layer comprises a metallic coating.

5. A method of enhancing the electromagnetic barrier properties of a substrate which comprises the steps of
   (a) applying a surface coating to said substrate; and
   (b) modifying the surface of said coating by providing a plurality of sets of microembossed patterns on said coating, said plurality of sets of microembossed patterns having a line density between 100 and 50,000 lines per square centimeter and having a depth less than the thickness of said surface layer such that said substrate is not altered, in order to increase the degree of reflectance of incident electromagnetic energy of falling upon said coating to thereby reduce the penetration of said substrate by the incident electromagnetic energy, said coating being metallized.

6. The method of claim 5, wherein said electromagnetic energy is in the range of visible light.

7. The method of claim 5, wherein said incident electromagnetic energy has a frequency below infrared.

8. The method of claim 5, wherein said incident energy has a frequency in the range of ultraviolet and beyond.

9. The method of claim 5, wherein said coating comprises a metallic coating.

10. The method of claim 5, wherein said plurality of sets of microembossed patterns are provided in at least two different degrees of variation.

11. The method of claim 10, wherein said plurality of sets of microembossed patterns are in the form of surface corrugations which are disposed at an angle with respect to each other.

12. The method of claim 11, wherein the plurality of sets of microembossed patterns form at least a right angle between them.

13. The method of claim 12, wherein the plurality of sets of microembossed patterns are provided by at least three different embossment patterns.

14. The method of claim 13, wherein the plurality of sets of microembossed patterns are uniformly distributed to form a symmetric repetitive pattern on the surface of said substrate.

15. The method of claim 1, wherein each of said plurality of sets of microembossed patterns are in the form of non-parallel surface corrugations.

16. The method of claim 1, wherein said plurality of sets of microembossed patterns are in the form of irregularly spaced surface corrugations.

17. The method of claim 5, wherein each of said plurality of sets of microembossed patterns are in the form of non-parallel surface corrugations.

18. The method of claim 5, wherein said plurality of sets of microembossed patterns are in the form of irregularly spaced surface corrugations.

19. The method of claim 4, wherein said metallic coating has a thickness of about 400 Å.

20. The method of claim 9, wherein said metallic coating has a thickness of about 400 Å.

* * * * *

UNITED STATES PATENT AND TRADEMARK OFFICE
CERTIFICATE OF CORRECTION

PATENT NO. : 5,529,828
DATED : 06/25/96
INVENTOR(S) : Kirit Patel; John R. Pennace It is certified that error appears in the above-indentified patent and that said Letters Patent is hereby corrected as shown below:

Title page, item [*] Notice:, change "May 18, 2007" to --May 18, 2010--

Signed and Sealed this

Twenty-fourth Day of June, 1997

*Attest:*

BRUCE LEHMAN

*Attesting Officer*     *Commissioner of Patents and Trademarks*